United States Patent [19]
Minachev et al.

[11] 3,764,563
[45] Oct. 9, 1973

[54] METHOD OF PREPARING GRANULATED ZEOLITE CATALYSTS AND SORBENTS

[76] Inventors: Khabib Minachevich Minachev, Leninsky prospekt, 57, kv. 15; Evgeny Sergeevich Mortikov, Leninsky prospekt, 61/1, kv. 34, both of Moscow; Alexandr Semenovich Leontiev, ulitsa Gagarina, 13, kv. 13, Salavat Bashkirskoi Assr; Alexei Alexeevich Masloboev-Shvedov, Nagatinskaya naberezhnaya, 16, kv. 75: Nikalai Fedorovich Kononov, ulitsa Garibaldi, 13/54, kv. 4, both of Moscow, all of U.S.S.R.

[22] Filed: Mar. 30, 1972

[21] Appl. No.: 239,804

[52] U.S. Cl. .............................................. 252/455 Z
[51] Int. Cl. .............................................. B01j 11/40
[58] Field of Search .......................... 252/455 Z, 448

[56] References Cited
UNITED STATES PATENTS

| | | | |
|---|---|---|---|
| 3,140,253 | 7/1964 | Plank et al. | 208/120 |
| 3,405,057 | 10/1968 | Neuzil et al. | 252/455 Z |
| 3,528,615 | 9/1970 | Kokotailo | 241/1 |

*Primary Examiner*—C. F. Dees
*Attorney*—John C. Holman et al.

[57] ABSTRACT

A method of preparing granulated zeolite catalysts and sorbents, consisting in that the starting zeolite is shaped into granules. The shaping can be effected either in the presence of a binder taken in a quantity not higher than 30 per cent by weight of the zeolite or without a binder. The resulting granules are treated with a polar liquid at a temperature of 150° to 300°C under a pressure of 80 to 120 atm, dried at a temperature of 100° to 120°C and calcined at a temperature of 380° to 550°C. In case the starting zeolite is used in the Na-form, cation exchange can be effected. From technological considerations it is recommendable that the zeolite granules directly after the shaping thereof be dried at a temperature of 100° to 120°C and calcined at a temperature of 380° to 550°C. The present method allows a considerable increase in the strength of granulated zeolite catalysts and sorbents and, hence, in their efficiency. The mechanical strength of the catalysts and sorbents thus prepared becomes 3 to 10 times higher than that of zeolite catalysts prepared without the treatment of the granules with a polar liquid. No changes are observed in the sorption capacity and catalytic activity of the zeolites.

18 Claims, No Drawings

METHOD OF PREPARING GRANULATED ZEOLITE CATALYSTS AND SORBENTS

The present invention relates to methods of preparing granulated zeolite catalysts and sorbents. Such catalysts and sorbents are widely employed in petrochemical industry.

Known in the art is a method of preparing granulated zeolite catalysts and sorbents by shaping a starting zeolite into granules and drying the granules thus prepared at a temperature of 380° to 550°C.

The known method is disadvantageous in that the resulting granulated zeolite catalysts and sorbents feature an insufficiently high mechanical strength, this causing their rapid wear and a reduction in the efficiency thereof. A high content of the binding agent in said catalysts and sorbents (up to 85 percent by weight of the zeolite) leads to a reduction in the selectivity of these catalysts and sorbents.

It is an object of the present invention to provide such a method of preparing granulated zeolite catalysts and sorbents, which would allow an increase in the mechanical strength and, hence, in the efficiency of the catalysts and sorbents of the type described without a change in their activity and selectivity.

In accordance with the said and other objects, the invention results in that the starting zeolite is shaped into granules. The resulting granules, according to the invention, are treated with a polar liquid at a temperature of 150° to 300°C under a pressure of 80 to 120 atm. Then the zeolite granules are dried at a temperature of 100° to 120°C and calcined at a temperature of 380° to 550°C.

As said polar liquid it is recommendable to use water, an aliphatic alcohol, or a mixture of water with an aliphatic alcohol.

The method proposed herein allows the shaping of granules of zeolite catalysts and sorbents to be performed either without a binder or in the presence of a binder in a quantity not higher than 30 per cent by weight of the zeolite.

The treatment of the granules of zeolite catalysts and sorbents with a polar liquid results in a 3- to 10-fold increase in the mechanical strength of these granules, irrespective of the kind and quantity (from 0 to 30 percent) of the binder therein, the limit value of said mechanical strength being 3 kg/mm$^2$. No changes in the sorption capacity, in the distribution of secondary pores and in the catalytic activity of the zeolites are observed.

For changing the chemical composition of the starting zeolite in the Na-form with a view to imparting the required properties thereto, the granules of said zeolite, either prior to or after the treatment thereof with the polar liquid, can be treated with an aqueous solution of a salt of a metal belonging to the II or III Group of the Periodic Table. Besides, for the same purpose, it is possible to treat with an aqueous solution of salts of said metals the starting zeolite in the Na-form prior to shaping it into granules. Said versions of the cation-exchange procedure can be effected in various combinations.

In all the above-described embodiments of the present method, from technological considerations, it is recommendable, that the zeolite granules, directly after the shaping thereof, be dried at a temperature of 100° to 120°C and calcined at a temperature of 380° to 550°C.

The present method of preparing granulated zeolite catalysts and sorbents is carried out into effect as follows.

The starting zeolite is shaped into granules in the presence of a binder, such as aluminium oxide, clay, aluminosilicate taken in a quantity not higher than 30 per cent by weight of the zeolite, or without a binder. The granules thus produced are charged into an autoclave. The autoclave is filled with a polar liquid, such as water, an aliphatic alcohol (ethanol, isopropyl alcohol, butanol, etc.), or a mixture thereof, whereafter the temperature is raised to 150°–300°C and the pressure, to 80–120 atm. The pressure in the autoclave may be created either with the help of a pump by feeding the polar liquid, or by means of an inert gas, or, else, by making use of the pressure of saturated vapours of the polar liquid at a temperature of 150° to 300°C. Instead of the autoclave any device operating under a pressure may be employed (such as a receiver or a reactor).

After a period of 10–30 hours the pressure in the autoclave is relieved and the polar liquid is drained off therefrom. The zeolite granules are discharged from the autoclave, dried at a temperature of 100° to 120°C and calcined at a temperature of 380° to 550°C.

As pointed out hereinabove, for changing the chemical composition of the starting zeolite in the Na-form with a view to imparting the required properties thereto, the granules of said zeolite, prior to or after the treatment thereof with the polar liquid are treated with an aqueous solution of a salt of a metal belonging to the II or III Group of the Periodic Table. To the same effect, it is possible to treat the starting zeolite in the Na-form with an aqueous solution of said salts prior to the shaping of the zeolite into granules. As stated hereinabove, all the said embodiments of the cation-exchange procedure may be effected in various combinations.

For technological reasons, in all the above-described embodiments of the present method it is recommendable that the zeolite granules, directly after the shaping thereof, be dried at a temperature of 100° to 120°C and calcined at a temperature of 380° to 550°C.

The zeolites prepared by the present method can be used as sorbents for the separation, purification and dehumidification of hydrocarbons and also as catalysts of cracking, isomerization, alkylation and disproportionation processes.

For a better understanding of the present invention, given hereinbelow are illustrative examples of the preparation of granulated zeolite catalysts and sorbents.

Example 1

A zeolite CaY with a molar ratio $SiO_2/Al_2O_3 = 4.6$ and a degree of exchange for calcium equal to 70 percent was shaped with freshly reprecipitated aluminium oxide produced by the sulphate method. The moulding mixture consisted of 20 wt.% of aluminium oxide and 80 wt.% of the zeolite as calculated for dry product. The resulting granules were cylinders 4×5 mm in size. These granules were dried at a temperature of 100°C and calcined at a temperature of 500°C. The characteristics of the zeolite were as follows: bulk weight of the granules, 0.60 to 0.65 g/cm$^3$; crushing strength of the granules (when tested between parallel plates), 0.4 kg/mm$^2$ and 0.5 kg/mm; size of secondary pores, 40 to 100 A and 1,000 to 2,600 A ; sorption capacity of the zeolite for benzene, 38 percent; acidity in titration with butylamine, 0.78 mequiv./g.

The zeolite granules having the above-specified characteristics were charged in an amount of 38 g (50 cm³) into a tubular reactor having a length of 1 m and internal diameter of 20 mm. A 4 percent aqueous solution of ethyl alcohol was passed through the reactor at a rate of 50 ml/hr with the help of a plunger pump during 24 to 30 hours at a temperature of 150°C and under a pressure of 120 atm. On the lapse of this period of time, the zeolite was discharged from the reactor, dried at a temperature of 100°C for 12 hours and calcined in a stream of air at a temperature of 120°C during 12 hours.

The tests of the granulated zeolite thus prepared have shown its strength to be 4 to 6 times higher than that of the zeolite not treated with the aqueous solution of alcohol. No weight losses or changes in the external appearance of the zeolite were traced. The characteristics of the zeolite were as follows: bulk weight of the granules, 0.62 to 0.65 g/cm³; crushing strength of the granules (when tested between parallel plates), 2.66 kg/mm² and 2.15 kg/mm; size of secondary pores, 40 to 100 A. and 1,000 to 2,000 A. ; sorption capacity of the zeolite for benzene, 35 percent; acidity in titration with butylamine, 0.75 mequiv./g.

Concurrently with the strengthening of the zeolite granules attained by treating them with the aqueous solution of ethyl alcohol, the zeolite was washed from chlorions that inhibit the catalytic activity of the zeolite in alkylation and disproportionation reactions.

The thus prepared granulated zeolite can be used as a catalyst in the processes of alkylation of paraffins and aromatic hydrocarbons with olefines for producing high-octane alkylation gasolines, ethylbenzene, cumene and butylbenzene.

Example 2

A zeolite NaY with a molar ratio $SiO_2/Al_2O_3 = 5$ was moulded with aluminium oxide produced by the nitrate method. The moulding mixture consisted of 5 wt.% of aluminium oxide and 95 wt.% of the zeolite as calculated for dry product. The resulting granules were cylinders 4×5 mm in size. Part of the granules for determining the zeolite characteristics were dried at a temperature of 120°C for 6 hours and calcined at a temperature of 550°C for 6 hours. The calcined granules were tested for crushing strength between parallel plates; the crushing test has shown the strength to be 0.22 kg/mm² and 0.12 kg/mm.

The remaining part of the granules of the zeolite, directly after the shaping thereof, in a quantity of 20 g, was charged into a perforated cartridge and the latter was placed into a 0.5 lit. autoclave. The autoclave was then filled with water, then with nitrogen, and thereafter a pressure of 100 atm was created therein and the temperature was raised to 300°C. After a period of 20 hours the zeolite was discharged from the autoclave, dried at a temperature of 120°C for 6 hours and calcined at a temperature of 550°C for 6 hours.

The crushing strength of the thus prepared zeolite granules (when tested between parallel plates) was 2.2 kg/mm² and 2.1 kg/mm, this being 10 times higher than the strength of the zeolite prepared without the treatment of the granules in the autoclave, in spite of a low content of the binder in the first-mentioned zeolite.

Example 3

A zeolite NaX with a molar ratio $SiO_2/Al_2O_3 = 2.6$ was moulded (without a binder) with a subsequent crystallization of the zeolite in the granules. Part of the resulting granules were treated with a 10 percent aqueous solution of calcium chloride at a temperature of 80°C. The degree of exchange for calcium was 75 percent. Then these granules were dried at a temperature of 120°C for 6 hours and calcined at a temperature of 500°C for 6 hours. The characteristics of the zeolite were as follows: bulk weight of the granules, 0.68 g/cm³; crushing strength of the granules (when tested between parallel plates), 1 kg/mm² and 0.9 kg/mm; wetting heat for water, 80 cal/kg; adsorption capacity for n-heptane at 20°C and relative pressure $P/P_s = 0.1$ was 0.25 cm³/g and at $P/P_s = 0.5$ it was 0.26 cm³/g.

The remaining part of the granules of the NaX zeolite directly after the shaping thereof was charged into a perforated cartridge which was then placed into a 0.5 lit. autoclave. The autoclave was filled with water, then with nitrogen, a pressure of 100 atm was created therein and the temperature raised to 300°C. After a period of 20 hours the zeolite was discharged from the autoclave and treated with a 10 percent aqueous solution of calcium chloride at a temperature of 80°C. The degree of exchange for calcium was 75 percent. Then the granules were dried at a temperature of 120°C for 6 hours and calcined at a temperature of 500°C for 6 hours. The zeolite had the following characteristics: bulk weight of the granules, 0.69 g/cm³; crushing strength of the granules (when tested between parallel plates), 2.45 kg/mm² and 1.92 kg/mm wetting heat for water, 80 cal/g; absorption capacity for n-heptane at 20°C and relative pressures $P/P_s = 0.1$ and $P/P_s = 0.5$ was 0.26 cm³/g.

Thus, the strength of the granulated zeolite more than twice exceeds that of the zeolite prepared without the treatment of the granules in the autoclave.

Example 4

A zeolite NaM (sodium-mordenite) with a molar ratio $SiO_2/Al_2O_3 = 10$ was moulded with aluminium oxide. The moulding mixture consisted of 10 wt.% of aluminium oxide and 90 wt.% of the zeolite as calculated for dry product. Part of the granules were dried at a temperature of 100°C for 12 hours and calcined in a stream of air at a temperature of 500°C for 12 hours. The resulting zeolite granules had a bulk weight of 0.65 g/cm³ and a crushing strength (when tested between parallel plates) of 0.15 kg/mm² and 0.27 kg/mm.

The remaining part of the granules of the NaM zeolite directly after the shaping thereof, in a quantity of 6.5 g (10 cm³) was charged into a perforated cartridge and the cartridge was placed into an autoclave, whereinto a 5 percent aqueous solution of butyl alcohol was supplied by a pump to a pressure of 120 atm; the temperature in the autoclave was raised to 200°C. After a period of 20 hours the zeolite was discharged from the autoclave, dried at a temperature of 100°C for 12 hours and calcined in a stream of air at a temperature of 500°C for 12 hours. The resulting zeolite granules had a bulk weight of 0.65 g/cm³ and a crushing strength (when tested between parallel plates) of 1.98 kg/mm² and 2.1 kg/mm.

Example 5

A powdered zeolite NaY with a molar ratio $SiO_2/Al_2O_3 = 5$ was treated at a temperature of 80°C with a 10 percent aqueous solution of calcium chloride. Then the powdered zeolite was moulded in the presence of aluminium oxide. The moulding mixture consisted of 30 wt.% of aluminium oxide and 70 wt.% of the zeolite as calculated for dry product. The resulting granules were dried at a temperature of 120°C for 12 hours and calcined at a temperature of 500°C for 6 hours. The crushing strength of the granules thus prepared (when tested between parallel plates) was 0.51 kg/mm$^2$ and 0.67 kg/mm. Then the granules were treated at a temperature of 70°C with a 7 percent aqueous solution of chlorides of rare-earth metals and ammonium, the weight ratio of the rare earths to ammonium being 3:1. The degree of exchange for the rare earths was 41 percent; for calcium, 28 percent; and for ammonium, 11 percent. Then the zeolite granules were washed with water to remove chlorions and thereafter they were charged into a 50 ml brass autoclave. The autoclave was filled to capacity with water and the contents were kept at a temperature of 300°C for 30 hours. The pressure in the autoclave at the temperature of 300°C was maintained within 80 to 84 atm. Then the granules were discharged from the autoclave, dried at a temperature of 110°C for 6 hours and calcined at a temperature of 380°C for 6 hours. The crushing strength of the zeolite granules thus prepared (when tested between parallel plates) was 2.3 kg/mm$^2$ and 3 kg/mm, this being 4-fold that of the zeolite prepared without the treatment of the granules in the autoclave. No changes in the physico-chemical properties of the zeolite or weight losses were observed.

The zeolite prepared without the treatment of the granules in the autoclave — sample I and the zeolite prepared with the treatment of the granules in the autoclave — sample II — were tested for their catalytic activity in processes of alkylation of benzene with ethylene and propylene and in the process of disproportionation of toluene.

The process of alkylation of benzene with ethylene on the granulated zeolite catalyst (on sample I and sample II) was carried out in the following manner. A sample in a quantity of 32 g (50 cm$^3$) was charged into a tubular flow reactor and then benzene and ethylene were passed therethrough at a molar ratio of 3:1 and at a rate of 3 hr$^{-1}$ (for the benzene). The alkylation was carried out at a temperature of 250°C and under a pressure of 30 atm. When sample I was employed, the concentration of ethylbenzene in the catalyzate was 31 to 33 percent and the yield (for the ethylene) was 85 to 90 percent. Under the same conditions sample II ensured the concentration of ethylenebenzene in the catalyzate of 30 to 32 percent and the yield (for the ethylene) of 85 to 90 percent. As can be seen from the results of this experiment, the treatment of the granules in an autoclave results in their strengthening, without impairing the catalytic activity of the zeolite.

The process of alkylation of benzene with propylene on the same samples of the zeolite was carried out as follows. A sample was charged into a tubular flow reactor and then benzene and propylene were passed therethrough at a molar ratio of 3:1 and at a rate of 3 hr$^{-1}$. The alkylation was performed at a temperature of 150°C and under a pressure of 10 atm. With the use of sample I, the concentration of cumene in the catalyzate was 28 to 29% with a complete conversion of the propylene. Sample II ensured under the same conditions 28 to 30 percent concentration of cumene in the catalyzate with a complete conversion of the propylene.

The process of disproportionation of toluene on said samples of the zeolite was carried out at a temperature of 450°C, under a pressure of 15 atm and with a flow rate of the toluene through the catalyst of 0.6 hr$^{-1}$. With sample I, the degree of conversion of toluene to disproportionation products was 48 percent. Similar result was obtained with the use of sample II.

Example 6

A starting powdered zeolite NaY with a molar ratio $SiO_2/Al_2O_3 = 4.6$ was moulded with aluminium oxide. The moulding mixture consisted of 16 wt.% of aluminium oxide and 84 wt.% of the zeolite as calculated for dry product. The resulting granules were dried at a temperature of 100°C for 8 hours and calcined at a temperature of 400°C for 8 hours. The crushing strength of the granules (when tested between parallel plates) was 0.28 kg/mm$^2$ and 0.17 kg/mm. Then the granules were treated at a temperature of 80°C with a 10 percent aqueous solution of calcium chloride with a view to partial replacement of sodium by calcium. Then the granules were charged into a reactor and kept at a temperature of 200°C and under a pressure of 80 atm during 10 hours in a medium of ethyl alcohol. After this period of time the granules were discharged from the reactor, washed with water and treated at a temperature of 80°C with a 5 percent aqueous solution of nickel nitrate for sodium and calcium to be partly replaced by nickel. The degree of exchange was: for calcium, 35 percent; for nickel, 55 percent. Then the granules were washed with water to remove the $NO_3'$- anion, dried at a temperature of 100°C for 8 hours and calcined at a temperature of 400°C for 8 hours. The crushing strength of the zeolite granules (when tested between parallel plates) was 1.91 kg/mm$^2$ and 1.72 kg/mm. The zeolite thus prepared proves to be an effective catalyst for the processes of polymerization and disporportionation of olefines.

What is claimed is:

1. A method of preparing granulated zeolite catalysts and sorbents, residing in that the starting zeolite is shaped into granules; the resulting granules are treated with a polar liquid at a temperature of 150° to 300°C and under a pressure of 80 to 120 atm; whereafter said granules are dried at a temperature of 100° to 120°C and calcined at a temperature of 380° to 550°C.

2. A method as of claim 1, wherein water, an aliphatic alcohol or a mixture of water with an aliphatic alcohol is used as a polar liquid.

3. A method as of claim 1, wherein the shaping of the starting zeolite into granules is effected in the presence of a binder taken in a quantity of not more than 30 percent by weight of the zeolite.

4. A method as of claim 1, wherein, in case the starting zeolite is used in the Na-form, the granules of said zeolite after being treated with a polar liquid, prior to the drying and calcination thereof, are treated with an aqueous solution of a salt of a metal selected from Groups II and II of the Periodic Table.

5. A method as of claim 1, wherein, in case the starting zeolite is used in the Na-form, the zeolite granules, prior to treating thereof with a polar liquid, are treated with an aqueous solution of a salt of a metal selected from Groups II and III of the Periodic Table.

6. A method as of claim 4, wherein the zeolite granules prior to being treated with a polar liquid are treated with an aqueous solution of a salt of a metal selected from Groups II and III of the Periodic Table.

7. A method as of claim 1, wherein, in case the starting zeolite is used in the Na-form, said zeolite prior to the shaping thereof into granules is treated with an aqueous solution of a salt of a metal selected from Groups II and III of the Periodic Table.

8. A method as of claim 4, wherein the starting zeolite prior to being shaped into granules is treated with an aqueous solution of a salt of a metal selected from Groups II and III of the Periodic Table.

9. A method as of claim 5, wherein the starting zeolite prior to being shaped into granules is treated with an aqueous solution of a salt of a metal selected from Groups II and III of the Periodic Table.

10. A method as of claim 6, wherein the starting zeolite prior to being shaped into granules is treated with an aqueous solution of a salt of a metal selected from Groups II and III of the Periodic Table.

11. A method as of claim 1, wherein the zeolite granules directly after the shaping thereof are dried at a temperature of 100° to 120°C and calcined at a temperature of 380° to 550°C.

12. A method as of claim 4, wherein the zeolite granules directly after the shaping thereof are dried at a temperature of 100° to 120°C and calcined at a temperature of 380° to 550°C.

13. A method as of claim 5, wherein the zeolite granules directly after the shaping thereof are dried at a temperature of 100° to 120°C and calcined at a temperature of 380° to 550°C.

14. A method as of claim 6, wherein the zeolite granules directly after the shaping thereof are dried at a temperature of 100° to 120°C and calcined at a temperature of 380° to 550°C.

15. A method as of claim 7, wherein the zeolite granules directly after the shaping thereof are dried at a temperature of 100° to 120°C and calcined at a temperature of 380° to 550°C.

16. A method as of claim 8, wherein the zeolite granules directly after the shaping thereof are dried at a temperature of 100° to 120°C and calcined at a temperature of 380° to 550°C.

17. A method as of claim 9, wherein the zeolite granules directly after the shaping thereof are dried at a temperature of 100° to 120°C and calcined at a temperature of 380° to 550°C.

18. A method as of claim 10, wherein the zeolite granules directly after the shaping thereof are dried at a temperature of 100° to 120°C and calcined at a temperature of 380° to 550°C.

* * * * *